(12) United States Patent
Hegde et al.

(10) Patent No.: US 12,555,079 B2
(45) Date of Patent: Feb. 17, 2026

(54) VERSION MAINTENANCE SERVICE FOR ANALYTICS COMPUTING

(71) Applicant: SAP SE, Walldorf (DE)

(72) Inventors: Anudeep Hegde, Bangalore (IN); Biddappa C K, Kodagu (IN); Indu Venugopal, Bangalore (IN)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 18/065,168

(22) Filed: Dec. 13, 2022

(65) Prior Publication Data

US 2024/0193551 A1 Jun. 13, 2024

(51) Int. Cl.
*G06F 8/65* (2018.01)
*G06F 8/71* (2018.01)
*G06Q 10/20* (2023.01)

(52) U.S. Cl.
CPC .............. *G06Q 10/20* (2013.01); *G06F 8/65* (2013.01); *G06F 8/71* (2013.01)

(58) Field of Classification Search
CPC .............. G06Q 10/20; G06F 8/65; G06F 8/71
See application file for complete search history.

(56) References Cited

U.S. PATENT DOCUMENTS

| | | | |
|---|---|---|---|
| 10,360,072 B2* | 7/2019 | Jubinski | G06F 16/2457 |
| 10,795,756 B2* | 10/2020 | Patel | G06F 11/079 |
| 11,314,732 B2* | 4/2022 | Mahadik | G06F 3/0647 |
| 11,354,150 B1* | 6/2022 | Guo | H04L 41/082 |
| 11,416,235 B2* | 8/2022 | Feigen | G06F 8/65 |
| 11,429,453 B1* | 8/2022 | Hamman | G06F 9/505 |
| 2013/0124720 A1* | 5/2013 | Wood | G06F 11/3409 709/224 |
| 2014/0278812 A1* | 9/2014 | Reinhold | G06F 11/0709 705/7.36 |
| 2016/0094483 A1* | 3/2016 | Johnston | G06F 8/65 709/226 |
| 2020/0097279 A1* | 3/2020 | Mukhopadhyay | G06F 8/65 |
| 2020/0257516 A1* | 8/2020 | Totale | G06F 8/71 |
| 2021/0028981 A1* | 1/2021 | Subramanian | H04L 41/0816 |

* cited by examiner

*Primary Examiner* — Daxin Wu
(74) *Attorney, Agent, or Firm* — SCHWEGMAN LUNDBERG & WOESSNER, P.A.

(57) ABSTRACT

Various examples are directed to systems and methods of maintaining a cloud-delivered analytics computing service. A version maintenance service may access version data for a subject instance of an analytics computing service and scan a plurality of remote data sources in communication with the subject instance of the analytics computing service to determine respective versions for the plurality of remote data sources. The version maintenance service may identify a first maintenance event describing a first maintenance instance of the analytics computing service that is different than the subject instance of the analytics computing service and has a version equivalent to the version of the subject instance of the analytics computing service. Responsive to identifying the first maintenance event, the version maintenance service may initiate a corrective action.

20 Claims, 8 Drawing Sheets

VERSION MAINTENANCE SERVICE FOR ANALYTICS COMPUTING

BACKGROUND

Analytics computing services are implemented for consumer enterprises to provide analysis of data. An analytics computing service may be executed, for example, in a cloud environment and may be accessible by users associated with the consumer enterprise. The analytics computing service may be in communication with various data sources and may be arranged to gather, integrate, analyze, and/or present insights regarding underlying data to users associated with the consumer enterprise. The consumer enterprise may be, for example, a business enterprise or other enterprise that utilizes the analytics computing service.

BRIEF DESCRIPTION OF DRAWINGS

The present disclosure is illustrated by way of example and not limitation in the following figures.

DETAILED DESCRIPTION

Figure 1:
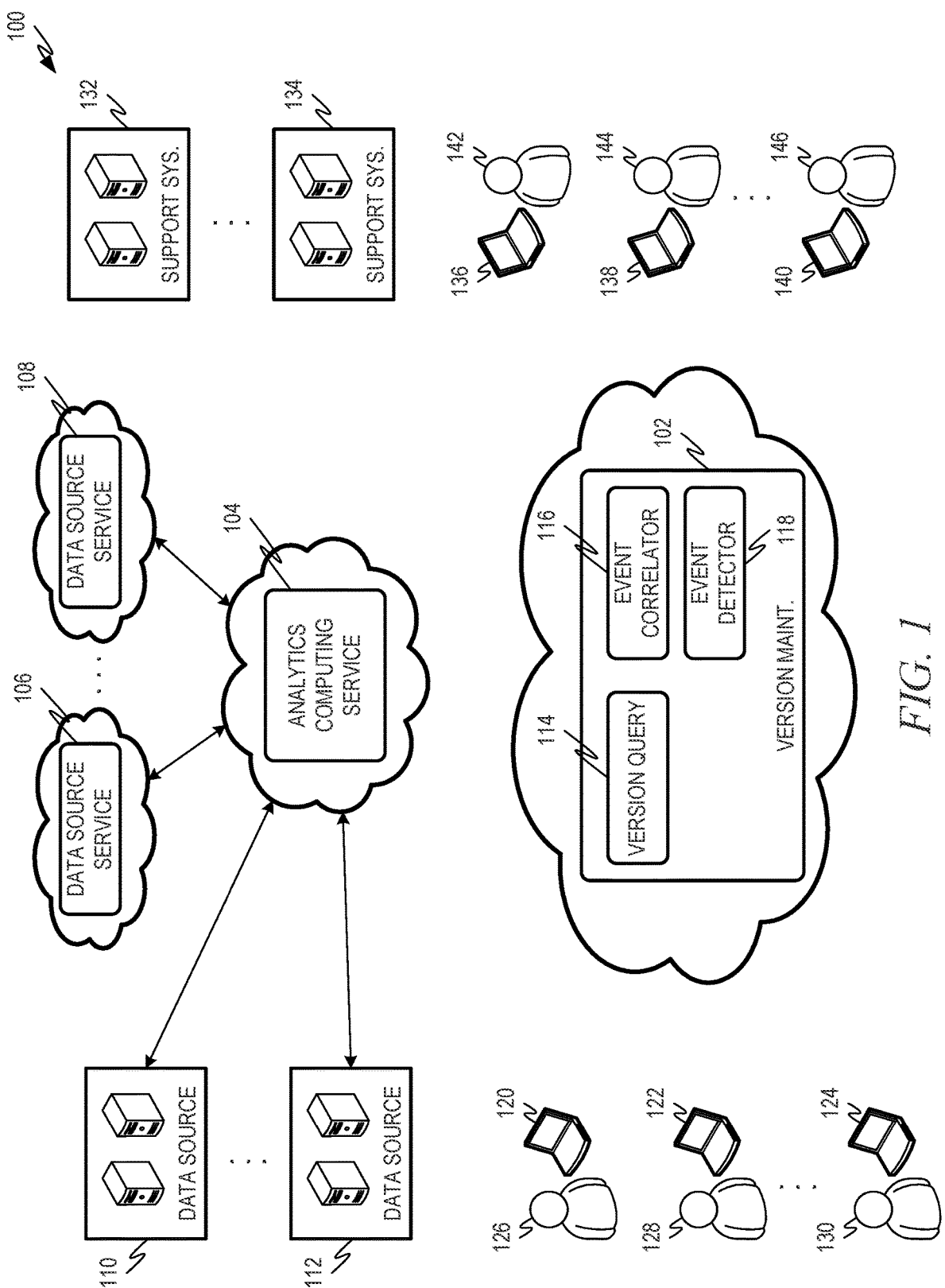
FIG. 1 is a diagram showing one example of an environment including a version maintenance service executing with an analytics computing service.

An analytics computing service can be configured to perform various tasks using data received from various data sources. Tasks performed by an analytics computing service can include, for example, providing various reports, forecasts, responses to user queries, and/or the like based on underlying resources. An example analytics computing service is the SAP® Analytics Cloud application available from SAP SE of Waldorf, Germany.

An analytics computing service may utilize data retrieved from various data sources and, in some examples, other resources such as model resources. Data sources may include for example, database management systems or other data storage systems. Data sources may be implemented in various different forms. For example, in some examples, a data source may be or include a database management system executed in an on-premise computing system. In an on-premise computing system, the various components of a data resource may be located at a premises of the consumer enterprise. For example, the consumer enterprise may implement and maintain one or more servers or other computing components that are to execute an on-premise data source.

Also, in some examples, one or more data sources may be cloud-delivered. In a cloud service delivery arrangement, a software provider, referred to herein as a cloud service provider, delivers software functionality directly to consumer systems via the Internet or another suitable network. Particulars of the provisioning are handled remotely by the cloud service provider. The consumer systems may include user computing devices by which various users consume the cloud-delivered services. The consumer systems may include user computing devices of users associated with the consumer enterprise.

The various data sources in communication with an analytics computing service may be updated or upgraded periodically. For example, a cloud-delivered database management service may be periodically updated by its cloud service provider. Also, for example, the provider of an on-premise database management system or similar system may periodically provide version upgrades to be installed at the on-premise computing system. Upgrades to data sources may be provided, for example, to correct bugs or other errors in the prior version, to add new functionality or features, and/or for various other reasons. The analytics computing service itself may also be subject to periodic version upgrades.

Because an analytics computing service communicates with disparate data sources, the version mismatches between the analytics computing service and one or more data sources can create a challenge. For example, a version upgrade to a data source may modify an application programming interface (API) or other functionality of the data source causing the data source to no longer respond in the way expected by the analytics computing service. This may lead to failures when users of the consumer entity attempt to utilize the analytics computing service in a manner that accesses the upgraded data source. Similar problems may occur when a version upgrade is performed to the analytics computing service itself. For example, the upgrade to the analytics computing service may change the way that the analytics computing service interacts with its various data sources. One or more of the data sources may not respond as expected, leading to failures of the analytics computing service.

Problems due to version mismatch may be exacerbated in arrangements where the analytics computing service is provided by one provider entity and one or more of the data sources are provided by other provider entities. For example, different provider entities may not coordinate upgrades with one another. As a result, a user of the analytics computing service may experience a failure of the analytics computing service due to version mismatch without warning.

Various examples described herein address these and other problems the utilizing a version maintenance service. The version maintenance service may be a cloud-delivered service executed at a cloud environment and may be configured to operate with one or more instances of a cloud-delivered analytics computing service. Because the version maintenance service is executed as a cloud-delivered service, it may be conveniently provided to consumer entities of the analytics computing service, for example, without having the consumer entities download and install new software at an on-premise system.

The version maintenance service may access version data for a subject instance of the analytics computing service. The version data for the subject instance of the analytics computing service may describe a version of the subject instance of the analytics computing service. The version maintenance service may also scan the remote data sources that are in communication with the subject instance of the analytics computing service. The remote data sources that are in communication with an analytics computing service may depend, in some examples, on the way that a particular consumer entity has configured the analytics computing service. For example, an instance of an analytics computing service may be in communication with one or more data sources implemented as cloud-delivered services and/or one or more data sources implemented using on-premise computing systems.

The version maintenance service may also access maintenance data records for the analytics computing service. The maintenance data records may include a plurality of records describing maintenance events that have occurred with the subject instance of the analytics computing service and/or with other instances of the analytics computing service. A maintenance data event may occur when a user associated with the consumer entity encounters an issue or event with the execution of an instance of the analytics computing service. The user may be in communication with an administrative user (for example, an administrative user associated with the provider of the analytics computing service). The administrative user may troubleshoot the maintenance event and, if possible, provide a solution to the user and/or associated consumer entity. The administrative user may also generate a maintenance data record describing the maintenance event. In some examples, the maintenance data record for a maintenance event may be tagged with version tag data describing the versions of the analytics computing service and of one or more data sources in communication with the analytics computing service.

The version maintenance service, upon accessing the maintenance data records, may identify one or more maintenance events described by the maintenance data records that occurred with instances of the analytics computing service and associated data sources having versions equivalent to the version of the subject analytics computing service and/or one or more of its associated data sources. In some examples, the version maintenance service may utilize the version tag data to identify maintenance data records describing relevant maintenance events.

Responsive to identifying the one or more maintenance events, the version maintenance service may initiate a corrective action to the subject instance of the analytics computing service. The corrective action may include the version maintenance service initiating a version upgrade to the subject instance of the analytics computing service and/or to one or more of the remote data sources. Consider an example in which one of the identified maintenance events occurred with an instance of the analytics computing service executing a version X.Y and a version of a remote data source executing a version A.B. The occurrence of a maintenance event in an arrangement utilizing these two versions may indicate a version mismatch between the two indicated versions. In this example, the version maintenance service may initiate a version upgrade of the analytics computing service to a higher version (e.g., X.Z) and/or may initiate a version upgrade of the remote data source to a higher version (e.g., A.C). In some examples, the corrective action may involve providing an indication of the versions of the respective components and/or an indication of a version upgrade to be performed to an administrative user such as, for example, one or more of the administrative users 142, 144, 146.

In some examples, the version maintenance service may also be configured to generate a version data package for the subject instance of the analytics computing service. For example, the version maintenance service may receive an indication of a maintenance event. The version maintenance service may access version data for the analytics computing service and scan for remote data source version data. The version maintenance service may generate the version data package from the version data describing the subject instance of the analytics computing service and the various data sources in communication with the subject instance of the analytics computing service.

In some examples, the version maintenance service may receive an indication of a maintenance event that has occurred with the subject instance of the analytics computing service. The version maintenance service may provide the generated version data package to a user computing device of an administrative user who is addressing the maintenance event. In some examples, the version maintenance service may review maintenance data records and determine if a version mismatch can be determined for the subject analytics computing service experiencing the current maintenance event. If a version mismatch can be determined, the version maintenance service may initiate a corrective action, as described herein. If no version mismatch can be determined, the version maintenance service may provide the version data package to the relevant administrative user.

FIG. 1 is a diagram showing one example of an environment 100 including a version maintenance service 102 executing with an analytics computing service 104. The version maintenance service 102 may be a cloud-delivered service. The analytics computing service 104 is implemented in a cloud environment, which may be a public cloud environment or a private cloud environment. In a private cloud environment, the consumer enterprise may provide applications, implement storage, and the like, to implement the analytics computing service 104 at the private cloud environment. For example, the consumer enterprise may configure the analytics computing service 104 at the private cloud environment, for example, by providing one or more executables that will execute at the private cloud environment. Executables and/or other software for implementing the analytics computing service 104 at the private cloud environment may be provided, for example, by a software provider. Users 126, 128, 130 of the consumer enterprise may access the analytics computing service 104 at the private cloud environment, for example, to request, configured, and/or consume the analytics reports and/or other outputs of the analytics computing service 104.

In a public cloud environment, the cloud environment is arranged into a number of tenancies implemented by a cloud service provider. The cloud service provider may provide one or more components of the analytics computing service 104 at the public cloud environment. The consumer enterprise may hold one or more tenancies, allowing users 126, 128, 130 of the consumer enterprise to access the public cloud environment to consume the analytics reports and/or other outputs of the analytics computing service 104.

The analytics computing service 104 may be in communication with various remote data sources, such as data source services 106, 108 and on-premise data sources 110, 112. The remote data sources may be or include various different computing systems and/or services for storing data. The data stored at the remote data sources, such as data source services 106, 108, and on-premise data sources 110, 112 can be used by the analytics computing service 104 to generate various analytics outputs such as reports, forecasts, responses to user queries, and/or the like, as described herein.

Remote data sources may include cloud-delivered data source services 106, 108 and/or on-premise data sources 110, 112. Cloud-delivered data source services 106, 108 may be cloud-delivered services, as described herein. For example, a cloud service provider may implement the data source services 106, 108 in a public cloud environment. In some examples, one or more of the data source services 106, 108 may be implemented in a private cloud environment, for example, by the consumer enterprise. Users 126, 128, 130 associated with the consumer enterprise may access the data source services 106, 108 remotely. Also, as described herein, the analytics computing service 104 may access the data source services 106, 108. Examples of cloud-delivered data source services 106, 108 may include cloud versions of S/4 HANA™, SAP Concur®, SAP Successfactors®, SAP Data Warehouse Cloud, Inbound Document (IBD), available from SAP SE of Waldorf, Germany. Other examples of cloud-delivered data source services 106, 108 may include SQL database services such as, for example, BigQuery® available from Google, LLC of Mountain View, California, Sharepoint® available from Microsoft Corporation of Redmond, Washington, various data storage products available from Salesforce, Inc. of San Francisco, California, and/or the like.

On-premise data sources 110, 112 may be implemented at one or more on-premise computing systems, which may be implemented by the consumer entity and/or another suitable entity. Example of on-premise data sources 110, 112 may include on-premise versions of S/4 HANA™, SAP Business Warehouse, SAP Business Planning and Consolidation, SAP HANA™, various SQL or other database management systems executed at an on-premise computing system and/or the like.

Users 126, 128, 130 may be associated with the consumer enterprise utilizing the analytics computing service 104. The users 126, 128, 130 may access the analytics computing service 104 and/or one or more of the various data sources, such as data source services 106, 108 and on-premise data sources 110, 112, utilizing user computing devices 120, 122, 124. User computing devices 120, 122, 124 may be or include various different types of computing devices such as, for example, desktop computers, laptop computers, tablet computers, mobile computing devices, and/or the like.

The environment 100 also includes support systems 132, 134. Support systems 132, 134 may store various maintenance data records describing maintenance events occurring at the analytics computing service 104 and/or at other instances of the analytics computing service. The support systems 132, 134 may be implemented in an on-premise computing system and/or as cloud-delivered services. In some examples, support systems 132, 134 store and/or maintain maintenance data records describing maintenance events at the analytics computing service 104 and at other instances of the analytics computing service.

Support systems 132, 134 may be in communication with various administrative users 142, 144, 146. Administrative users 142, 144, 146 may access the support systems 132, 134, the analytics computing service 104, and/or the version maintenance service 102 via one or more user computing devices may be similar to the user computing devices 120, 122, 124.

The version maintenance service 102 may comprise various subsystems 114, 116, 118. The subsystems of the version maintenance service 102 may be implemented in various different ways. In some examples, the subsystems of the version maintenance service 102 may be implemented as respective functions associated with a single executable. In other examples, the subsystems of the version maintenance service 102 may be implemented as separate executables associated with a main executable of the version maintenance service 102. In some examples, the subsystems of the version maintenance service 102 may be implemented according to a microservice arrangement, where each subsystem is comprised of one or more microservices, which may be executed at respective containers, virtual machines, and/or the like.

The version maintenance service 102 may be in communication with the analytics computing service 104 and/or with the various data sources, such as data source services 106, 108 and on-premise data sources 110, 112. For example, the version maintenance service 102 (e.g., the version query subsystem 114 thereof) may obtain version data for the subject incident of the analytics computing service 104 and for the various data sources in communication with the instance of the analytics computing service 104.

The version maintenance service 102 (e.g., the event correlator subsystem 116 thereof) may access maintenance data records. For example, to obtain the maintenance data records, the version maintenance service 102 may query one or more support systems 132, 134. The version maintenance service 102 may analyze received maintenance data records to identify maintenance events from instances of the analytics computing service that are arranged in a manner similar to that of the analytics computing service 104. In some examples, the version maintenance service 102 may detect a version mismatch at the analytics computing service 104 if there is at least one maintenance event involving an instance of the analytics computing service having a version equivalent to the version of the analytics computing service 104 and at least one data source having a version and type equivalent to those of one of the data sources, such as data source services 106, 108 and on-premise data sources 110, 112.

Consider an example maintenance event involving an instance of the analytics computing service having a version equivalent to the version of the analytics computing service 104 and in communication with a data source with an equivalent type and version to that of the data source service 108. Such a maintenance event may indicate a version mismatch with the analytics computing service 104 and the data source service 108.

Consider another example maintenance event involving an instance of the analytics computing service having a version equivalent to the version of the analytics computing service 104 and in communication with (i) a data source with an equivalent type and version to that of the data source service 106 and (ii) a data source with an equivalent type and version to that of the on-premise data source 110. Such a maintenance event may indicate a version mismatch with the analytics computing service 104 and the data source services 106, 108. It will be appreciated that various other permutations of analytics computing service instance versions and data source versions may also indicate a version mismatch.

In some examples, the version maintenance service 102 may detect a version mismatch when a maintenance event is particularly related to communications between an instance of the analytics computing service having a version equivalent to that of the analytics computing service 104 and a data source having a type and version equivalent to one or more of the data sources, such as data source services 106, 108 and on-premise data sources 110, 112. In some examples, the version maintenance service 102 may not determine a version mismatch for an instance of the analytics computing service having a version equivalent to that of the analytics computing service 104 and in communication with at least one data source having a type and version equivalent to at least one of the data sources, such as data source services 106, 108 and on-premise data sources 110, 112, unless the maintenance event specifically relates to communications between the analytics computing service instance and the common data source.

Upon detecting a version mismatch, the version maintenance service 102 may initiate a corrective action. The corrective action may involve initiating a version upgrade of the analytics computing service 104 and/or one or more of the data sources, such as data source services 106, 108 and on-premise data sources 110, 112. The version upgrade may involve modifying the current version of the analytics computing service 104 and/or one or more of the data sources, such as data source services 106, 108 and on-premise data sources 110, 112. In some examples, the version maintenance service 102 may read one or more maintenance records. The maintenance records may indicate corrective actions that were taken to resolve the described maintenance events. The corrective actions may include performing version upgrades as described herein.

In some examples, the version maintenance service 102 initiates a version upgrade of the analytics computing service 104 by sending an instruction to the analytics computing service 104 and/or to one or more of the support systems 132, 134. The instruction may instruct the analytics computing service 104 and/or the relevant support system or systems 132, 134 to modify the version of the analytics computing service 104 to a target version, where the target version may be indicated by one or more maintenance event records. To initiate a version upgrade of a data source, such as data source services 106, 108 and on-premise data sources 110, 112, the version maintenance service may, in some examples, communicate directly with the respective data source, such as data source services 106, 108 and on-premise data sources 110, 112, and instruct the data source to initiate an upgrade.

In some examples, initiating a version upgrade of the analytics computing service 104 may include sending an instruction to one or more of the administrative users 142, 144, 146 via respective user computing devices 136, 138, 140. In response to the instruction, administrative users 142, 144, 146 may initiate the requested version upgrade. Also, in some examples, initiating a version upgrade of a data source, such as data source services 106, 108 and on-premise data sources 110, 112, may include sending an instruction message to one or more of the users 126, 128, 130 instructing the respective user to perform the version upgrade at the indicated data source or sources, such as data source services 106, 108 and on-premise data sources 110, 112.

The version maintenance service 102, in some examples, also includes an event detector subsystem 118. The event detector subsystem 118 may detect a maintenance event involving the analytics computing service 104 and/or other instances of the analytics computing service. For example, the event detector subsystem 118 may be in communication with the analytics computing service 104 and may receive a maintenance event alert from the analytics computing service 104 when a maintenance event occurs. In other examples, the event detector subsystem 118 may be in communication with one or more of the support systems 132, 134 and/or one or more of the administrative users 142, 144, 146. The support systems 132, 134 and/or administrative users 142, 144, 146 may provide one or more maintenance event alerts to the event detector subsystem 118 upon detection of a maintenance event at the analytics computing service 104.

Figure 2:
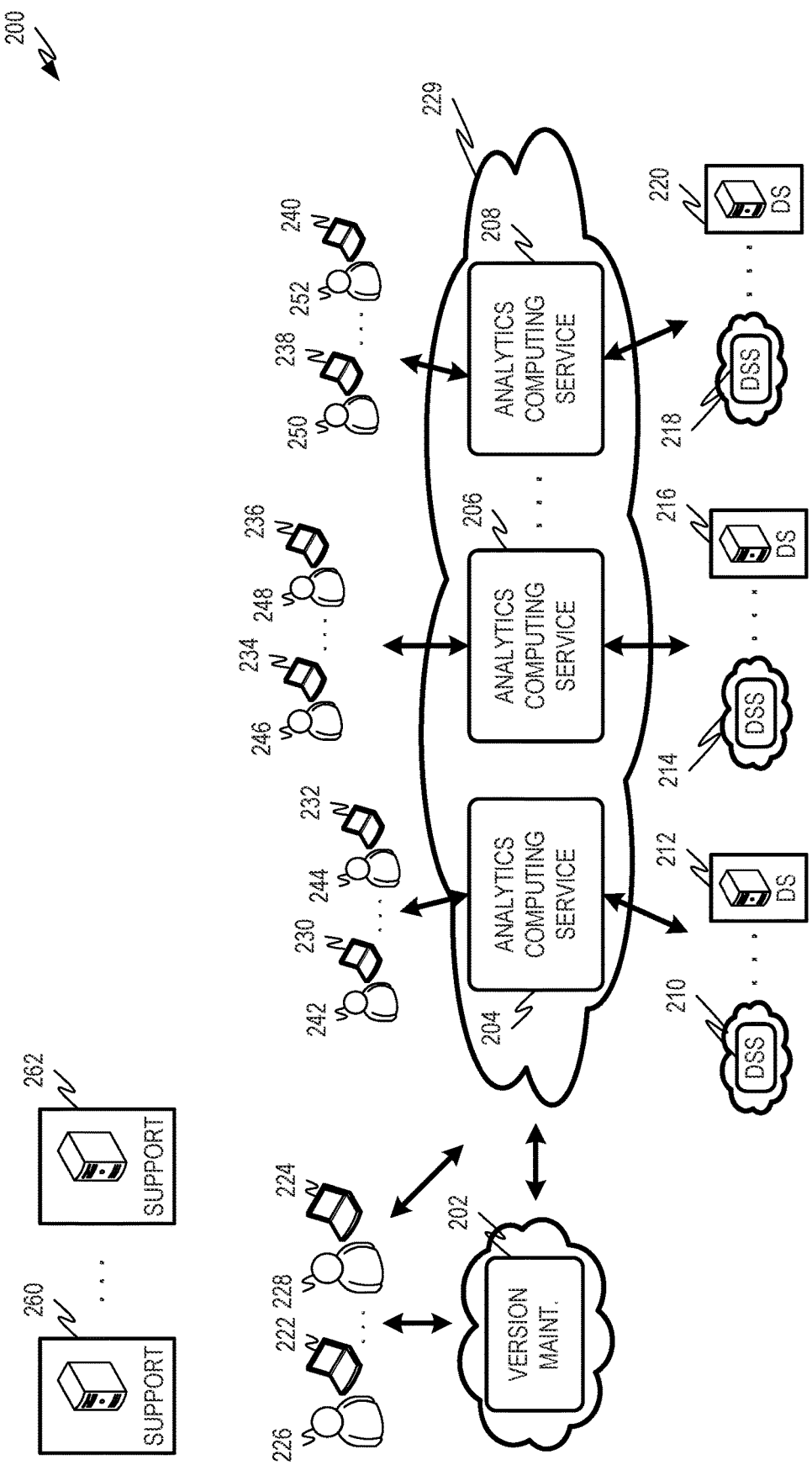
FIG. 2 is a diagram showing one example of an environment including multiple instances of an analytics computing service managed by a version maintenance service.

FIG. 2 is a diagram showing one example of an environment 200 including multiple instances 204, 206, 208 of an analytics computing service managed by a version maintenance service 202. In the example of FIG. 2, the instances 204, 206, 208 of the analytics computing service are executed at a cloud deployment 229. The cloud deployment, in some examples, is a public cloud deployment open to users 242, 244, 246, 248, 250, 252 from different consumer entities. For example, the cloud deployment 229 may comprise multiple tenancies, with each tenancy corresponding to a single consumer entity. In the example of FIG. 2, each instance 204, 206, 208 of the analytics computing service is installed at a distinct tenancy. For example, the instance 204 of the analytics computing service is installed at a first tenancy. It is in communication with data sources 210, 212 and with consumer enterprise users 242, 244 via user computing devices 230, 232. The instance 206 of the analytics computing service is installed at a second tenancy. It is in communication with data sources 214, 216 and with consumer enterprise users 246, 248 via user computing devices 234, 236. The instance 208 of the analytics computing service is installed at a third tenancy. It is in communication with respective data sources 218, 220 and with consumer enterprise users 250, 252 via user computing devices 238, 240.

In some examples, the users 242, 244, 246, 248, 250, 252 are associated with different consumer entities. For example, the users 242, 244 may be associated with the first consumer entity using the first tenancy. The users 246, 248 may be associated with a second consumer entity using the second tenancy. And the users 250, 252 may be associated with a third consumer entity using the third tenancy. Similarly, the respective data sources 210, 212, 214, 216, 218, 220 may be associated with the respective tenancies and customer entities. For example, the data sources 210, 212 may be associated with the first customer entity and the first tenancy. The data sources 214, 216 may be associated with the second customer entity and the second tenancy. The data sources 218, 220 may be associated with the third customer entity and the third tenancy.

The version maintenance service 202 may be in communication with administrative users 226, 228 via user computing devices 222, 224. The version maintenance service 202 may similarly be in communication with the respective instances 204, 206, 208 of the analytics computing service, the various data sources 210, 212, 214, 216, 218, 220, and/or one or more support systems 260, 262. Support systems 260, 262 may be similar to the support systems 132, 134 of FIG. 1. For example, the support systems 260, 262 may store maintenance data records with respect to all of the instances 204, 206, 208 of the analytics computing service at the cloud deployment 229. In some examples, the support systems 260, 262 may also store maintenance data records describing other instances of the analytics computing service implemented at other cloud deployment (not shown in FIG. 2).

Figure 3:
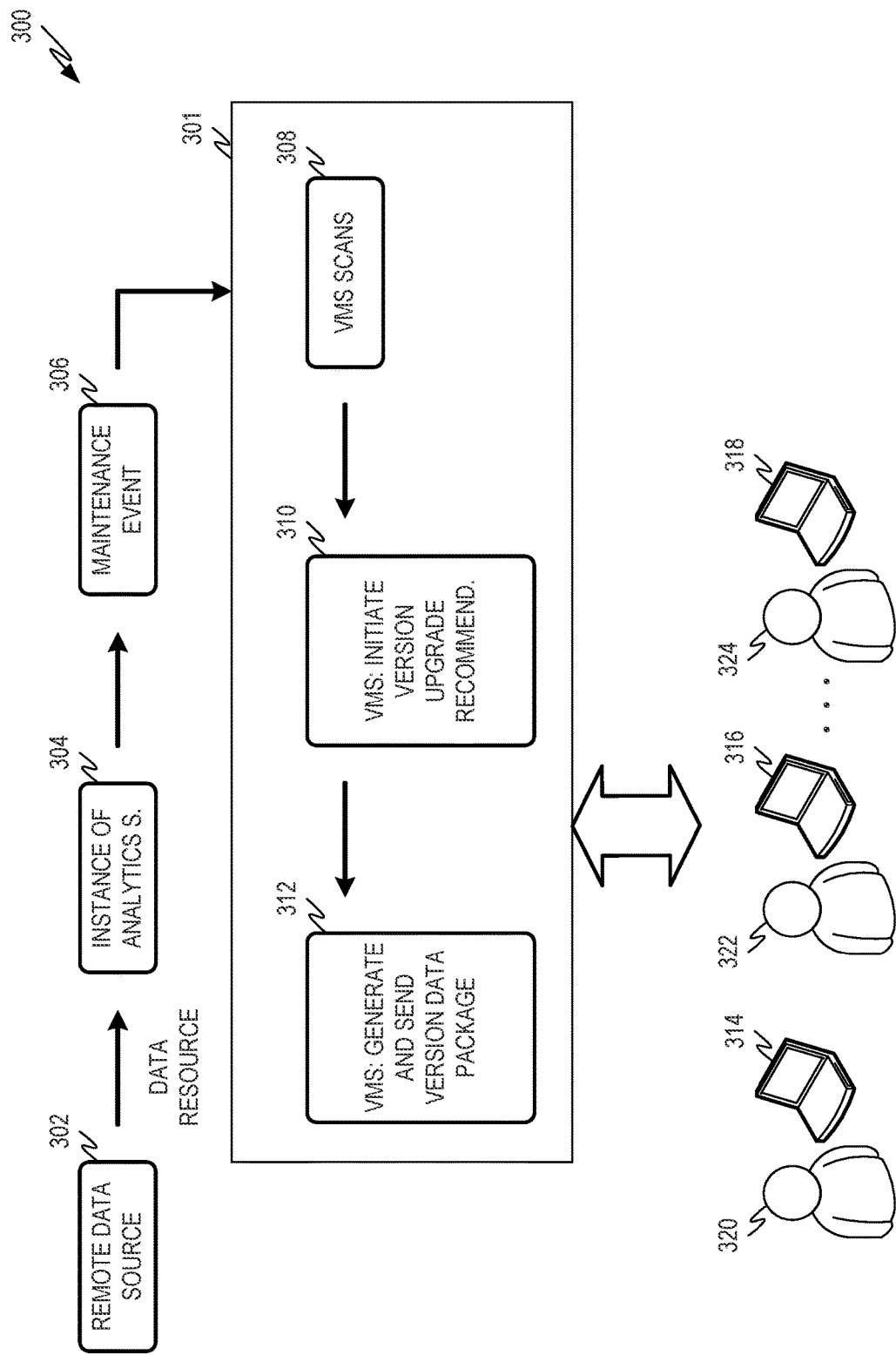
FIG. 3 is a diagram showing one example of a workflow that may be executed by a version maintenance service in an environment including an instance of an analytics computing service and one or more data sources.

FIG. 3 is a diagram showing one example of a workflow 300 that may be executed by a version maintenance service in an environment including an instance of an analytics computing service and one or more data sources (for example, similar to the environments 100 and 200 described herein). In the workflow 300, a remote data source 302 may provide a data resource to an instance 304 of the analytics computing service. The provision of the data resource may result in a maintenance event 306. For example, the instance 304 of the analytics computing service may send a request for the data resource to the remote data source 302 and may receive no reply. In another example, the instance 304 of the analytics computing service may send a request to the remote data source 302 and receive a reply, but the reply may not match the request or may otherwise be unusable to the instance 304 of the analytics computing service.

The box 301 includes operations 308, 310, 312 that may be executed by a version maintenance service such as the version maintenance service 102 of FIG. 1 or the version maintenance service 202 of FIG. 2. The version maintenance service may receive an indication of the maintenance event 306. For example, the version maintenance service (e.g., an event detector subsystem thereof) may detect a maintenance event as described herein. Also, in some examples, an administrative user 320, 322, 324 may provide the version maintenance service with an indication of the maintenance event 306 (e.g., via user computing devices 314, 316, 318).

The version maintenance service 102 may scan version data at operation 308. This may include determining a version of the instance 304 of the analytics computing service and determining a version of the remote data source 302 and/or of another remote data source or sources in communication with the instance 304 of the analytics computing service. At operation 310, the version maintenance service 102 may, optionally, initiate a version upgrade of the instance 304 of the analytics computing service and/or of the remote data source 302. For example, the version maintenance service may execute the operation 310 if it identifies a maintenance data record describing a maintenance event involving an equivalently situated analytics computing service 104.

At optional operation 312, the version maintenance service may generate a version data package and send the version data package to one or more of the administrative users 320, 322, 324. For example, if the version maintenance service does not identify a maintenance data record describing an equivalently situated instance of the analytics computing service, it may generate the version data package provided to one or more of the administrative users 320, 322, 324. The version data package may describe the version of the instance 304 of the analytics computing service, of the remote data source 302, and/or of another remote data source or sources in communication with the instance of the analytics computing service.

The administrative user 320, 322, 324 who receives the version data package may use the version data package to troubleshoot the maintenance event 306. The administrative user 320, 322, 324 may provide the version maintenance service 102 with resolution data indicating a resolution of the maintenance event 306. The version maintenance service or other suitable component may utilize the version data package and the resolution data to generate a new maintenance data record describing the maintenance event 306. The maintenance data record may be stored at a support system, as described herein.

Figure 4:
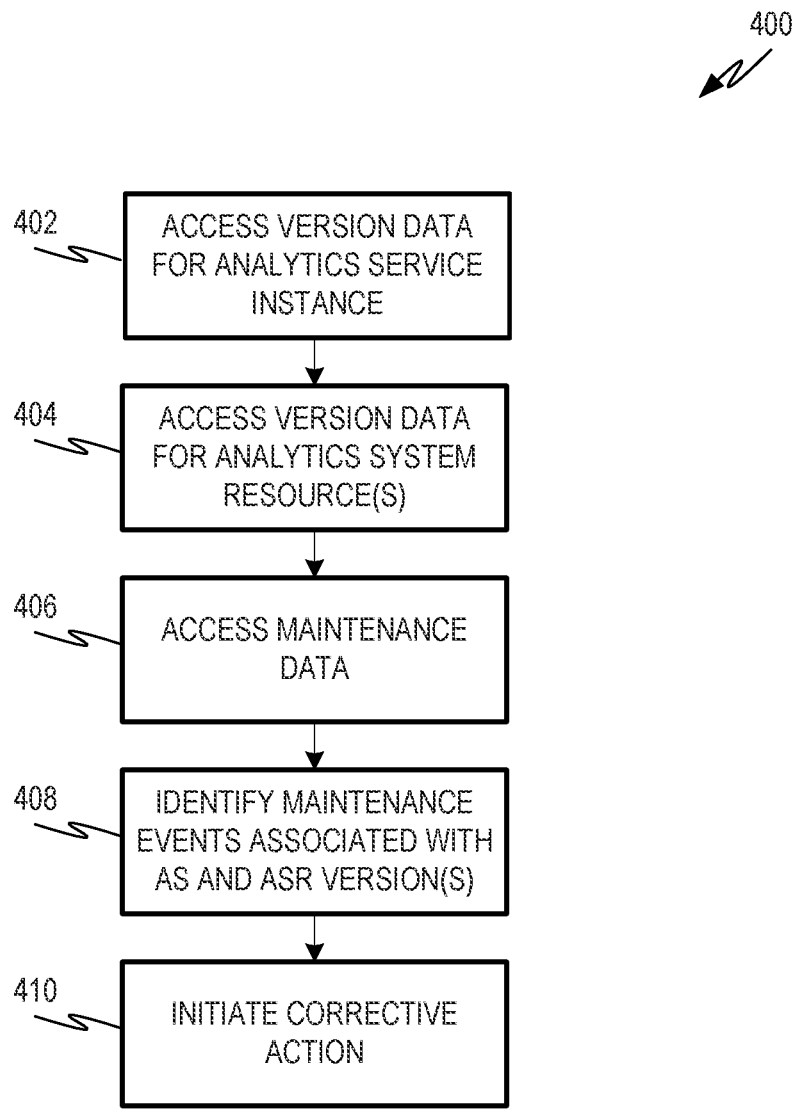
FIG. 4 is a flowchart showing one example of a process flow that may be executed by a version maintenance service.

FIG. 4 is a flowchart showing one example of a process flow 400 that may be executed by a version maintenance service, for example, similar to the version maintenance service 102 of FIG. 1 or the version maintenance service 202 of FIG. 2. The process flow 400 may be executed with respect to a subject instance of the analytics computing service.

At operation 402, the version maintenance service may access version data describing the subject instance of the analytics service. In some examples, the version maintenance service may query the subject instance of the analytics computing service to determine the version. The version of the subject instance of the analytics computing service may be indicated by a version identifier which may be, for example, an alphanumeric code or any other suitable version identifier. At operation 404, the version maintenance service may scan a plurality of remote data sources in communication with the subject instance of the analytics computing service. For example, the version maintenance service may query the subject instance of the analytics computing service to receive an indication of some or all of the remote data sources in communication with the subject instance of the analytics computing service. The version maintenance service may query each individual remote data source to determine its version. In another example, the subject instance of the analytics computing service may store an indication of the version of each remote data source with which it is in communication.

At operation 406, the version maintenance service may access maintenance data records describing maintenance events that have occurred at other instances of the analytics computing service. Each maintenance data record may describe a maintenance data event at another instance of the analytics computing service. In some examples, some or all of the maintenance data records may be tagged with tag data describing the version of the analytics computing service instance associated with the maintenance event. The tag data may also describe the versions of one or more remote data sources in communication with the instance of the analytics computing service that is associated with the maintenance event. For example, if the maintenance event is related to communications between an instance of the analytics computing service and any particular remote data source, the maintenance data record recording that maintenance event may include a tag indicating the version of the particular remote data source.

At operation 408, the version maintenance service may identify one or more maintenance events associated with instances of the analytics computing service that are arranged similar to the subject analytics computing service. For example, the version maintenance service may identify one or more maintenance events that were encountered by instances of the analytics computing service that have a version equivalent to that of the subject analytics computing service and wherein communication with one or more remote data sources having a type and version equivalent to at least one remote data source in communication with the subject instance of the analytics data service.

At operation 410, the version maintenance service may initiate a corrective action. For example, the version maintenance service may initiate a version upgrade of the subject instance of the analytics computing service and/or the or more remote data sources in communication with the subject instance of the analytics computing service that are equivalent in type and version to those indicated by the identified maintenance event or events.

Figure 5:
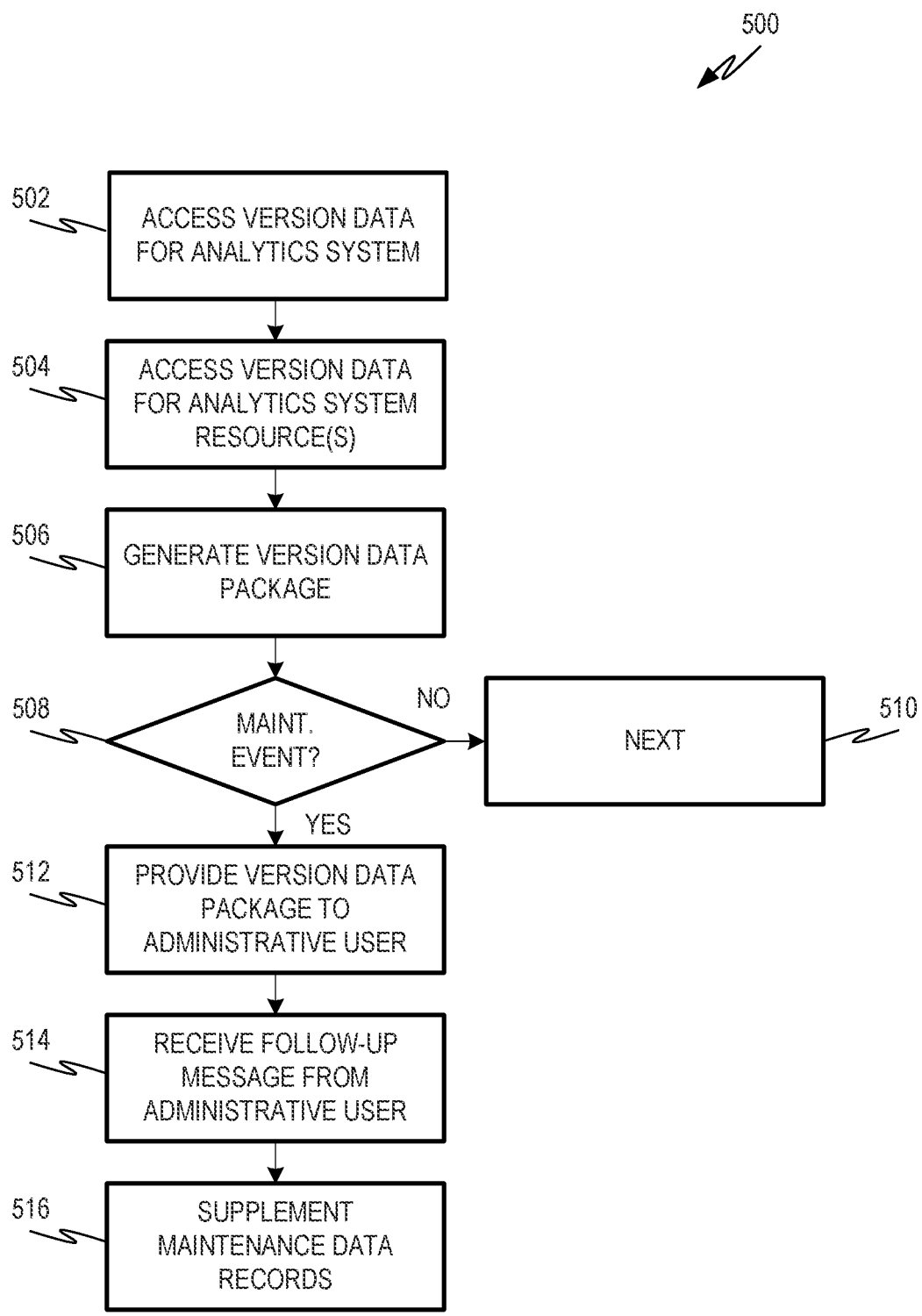
FIG. 5 is a flowchart showing another example of a process flow that may be executed by a version maintenance service.

FIG. 5 is a flowchart showing another example of a process flow 500 that may be executed by a version maintenance service, for example, similar to the version maintenance service 102 of FIG. 1 or the version maintenance service 202 of FIG. 2. The process flow 500 may be executed with respect to a subject instance of the analytics computing service.

At operation 502, the version maintenance service may access version data describing the subject instance of the analytics service. In some examples, the version maintenance service may query the subject instance of the analytics computing service to determine the version. The version of the subject instance of the analytics computing service may be indicated by a version identifier which may be, for example, an alphanumeric code or any other suitable version identifier. At operation 504, the version maintenance service may scan a plurality of remote data sources in communication with the subject instance of the analytics computing service. For example, the version maintenance service may query the subject instance of analytics computing service to receive an indication of some or all of the remote data sources in communication with the subject instance of the analytics computing service. The version maintenance service may query each individual remote data source to determine its version. In another example, the subject instance of the analytics computing service may store an indication of the version of each remote data source with which it is in communication.

At operation 506, the version maintenance service may generate a version data package. The version data package may describe the version of the subject instance of the analytics computing service and the versions of one or more remote data sources in communication with the subject instance of the analytics computing service. If one or more maintenance events indicate a version mismatch, the version data package may also include an indication of the severity of the version mismatch.

At operation 508, the version maintenance service may determine if a maintenance event has occurred with respect to the subject analytics computing service. The version maintenance service may be notified of a maintenance event with respect to the subject analytics computing service in any suitable manner. For example, the subject instance of analytics computing service may notify the version maintenance service of a maintenance event. In another example, a support system, such as the support system 132, 134, 260, 262 may notify the version maintenance service of the occurrence of the maintenance event at the subject analytics computing service. In another example, an administrative user may notify the version maintenance service of the occurrence of the maintenance event at the subject analytics computing service. If no maintenance event is detected, the version maintenance service may move to a next action at operation 510. In some examples, the version maintenance service may one or more administrative users with an indication of versions and/or version upgrades to the subject instance of the analytics computing service and/or to one or more remote data sources in communication with the subject instance of the analytics computing service. The next action may include, for example, storing the version data package at a support system. In some examples, the next action may include continuing to monitor for the occurrence of a maintenance event at the subject analytics computing service.

If a maintenance event is detected at the subject analytics computing service, then the version maintenance service may, at operation 512, provide the version data package to an administrative user. For example, the version maintenance service may provide the version data package to an administrative user who is assigned to resolve the maintenance event at the subject analytics computing service.

At operation 514, the version maintenance service may receive a follow-up message from the administrative user. The follow-up message may include resolution data describing a resolution of the maintenance event at the subject instance of the analytics computing service. At operation 516, the version maintenance service may utilize the version data package and the follow-up data to supplement the maintenance data record stored at one or more support systems. For example, the version maintenance service may generate a maintenance data record describing the maintenance event at the subject analytics computing service, where the maintenance data record may include a description of the maintenance event, the version data package describing the versions of the subject analytics computing service and one or more of its associated remote data sources, and at least a portion of the resolution data.

Figure 6:
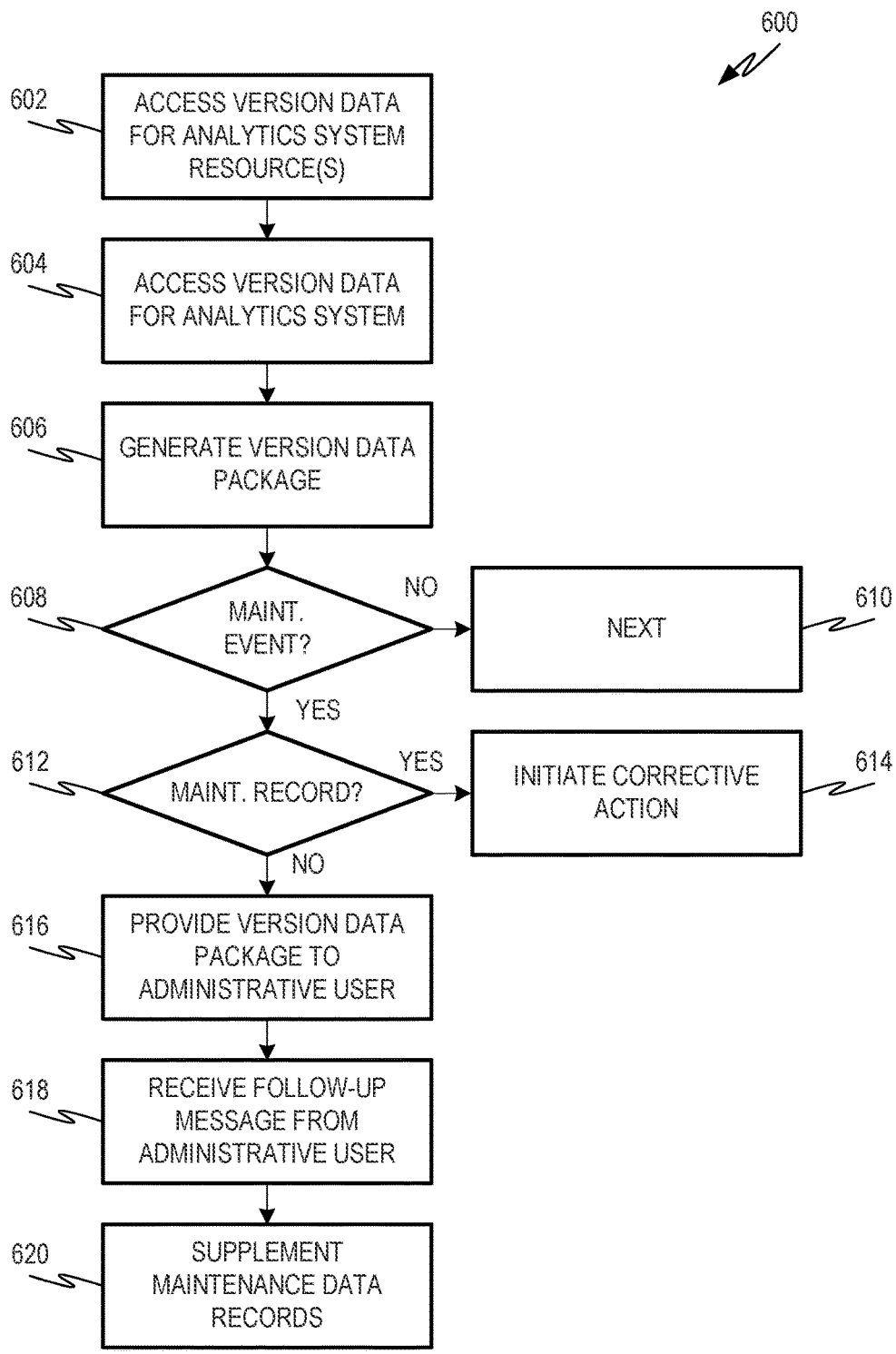
FIG. 6 is a flowchart showing yet another example of a process flow that may be executed by a version maintenance service.

FIG. 6 is a flowchart showing yet another example of a process flow 600 that may be executed by a version maintenance service (for example, similar to the version maintenance service 102 of FIG. 1 or the version maintenance service 202 of FIG. 2). The process flow 600 may be executed with respect to a subject instance of the analytics computing service. The process flow 600 shows another example in which the version maintenance service is used to respond to a maintenance event at the subject instance of the analytics computing service. In this example, the version maintenance service may provide the version data package to an administrative user, similar to what is described by the process flow 500, but may also, in some examples, correct the maintenance event, for example, by initiating a version upgrade.

At operation 602, the version maintenance service may access version data describing the subject instance of the analytics service. In some examples, the version maintenance service may query the subject instance of the analytics computing service to determine the version. The version of the subject instance of the analytics computing service may be indicated by a version identifier which may be, for example, an alphanumeric code or any other suitable version identifier. At operation 604, the version maintenance service may scan a plurality of remote data sources in communication with the subject instance of the analytics computing service. For example, the version maintenance service may query the subject instance of analytics computing service to receive an indication of some or all of the remote data sources in communication with the subject instance of the analytics computing service. The version maintenance service may query each individual remote data source to determine its version. In another example, the subject instance of the analytics computing service may store an indication of the version of each remote data source with which it is in communication.

At operation 606, the version maintenance service may generate a version data package. The version data package may describe the version of the subject instance of the analytics computing service and the versions of one or more remote data sources in communication with the subject instance of the analytics computing service.

At operation 608, the version maintenance service may determine if a maintenance event has occurred with respect to the subject analytics computing service. The version maintenance service may be notified of a maintenance event with respect to the subject analytics computing service in any suitable manner. For example, the subject instance of analytics computing service may notify the version maintenance service of a maintenance event. In another example, a support system, such as the support system 132, 134, 260, 262 may notify the version maintenance service of the occurrence of the maintenance event at the subject analytics computing service. In another example, an administrative user may notify the version maintenance service of the occurrence of the maintenance event at the subject analytics computing service. If no maintenance event is detected, the version maintenance service may move to a next action at operation 610. In some examples, the version maintenance service will send a version data package to an administrative user at operation 610 even if no maintenance event has been detected. The next action may include, for example, storing the version data package at a support system. In some examples, the next action may include continuing to monitor for the occurrence of a maintenance event at the subject analytics computing service.

If a maintenance event is detected at the subject analytics computing service, then the version maintenance service may, at operation 612, determine if it can locate one or more maintenance data records describing maintenance events at other instances of the analytics computing service that are arranged similar to the subject analytics computing service. For example, the version maintenance service may query one or more support systems 132, 134 to retrieve the maintenance data records, as described herein. If the version maintenance service identifies one or more maintenance events at instances of the analytics computing service arranged in a manner similar to that of the subject instance of the analytics computing service, then the version maintenance service may, at operation 614, initiate corrective action. The initiating a corrective action may be performed, for example, as described herein.

If no equivalent maintenance event can be determined at operation 612, then the version maintenance service may provide the version data package to an administrative user at operation 616. For example, the version maintenance service may provide the version data package to an administrative user who is assigned to resolve the maintenance event at the subject analytics computing service. In some examples, the generating of the version data package may be delayed until operation 616.

At operation 618, the version maintenance service may receive a follow-up message from the administrative user. The follow-up message may include resolution data describing a resolution of the maintenance event at the subject instance of the analytics computing service. At operation 620, the version maintenance service may utilize the version data package and the follow-up data to supplement the maintenance data record stored at one or more support systems. For example, the version maintenance service may generate a maintenance data record describing the maintenance event at the subject analytics computing service, where the maintenance data record may include a description of the maintenance event, the version data package describing the versions of the subject analytics computing service and one or more of its associated remote data sources, and at least a portion of the resolution data.

EXAMPLES

Example 1 is a system for maintaining a cloud-delivered analytics computing service, the system comprising: at least one processor programmed perform operations comprising: executing, a version maintenance service at a first cloud environment, the version maintenance service in communication with a subject instance of an analytics computing service, the subject instance of the analytics computing service being executed at the first cloud environment; accessing, by the version maintenance service, version data for the subject instance of an analytics computing service, the version data describing a version of the subject instance of the analytics computing service; scanning, by the version maintenance service, a plurality of remote data sources in communication with the subject instance of the analytics computing service to determine respective versions for the plurality of remote data sources; accessing, by the version maintenance service, maintenance data records describing a plurality of maintenance events associated with at least one instance of the analytics computing service executing at the first cloud environment; and initiating a corrective action, the corrective action being based at least in part on the maintenance data records, and the corrective action comprising at least one of initiating an upgrade of the subject instance of the analytics computing service or initiating an upgrade of at least one remote data source of the plurality of remote data sources in communication with the subject instance of the analytics computing service.

In Example 2, the subject matter of Example 1 optionally includes the operations further comprising identifying, by the version maintenance service, a first maintenance event of the plurality of maintenance events, the first maintenance event describing a first maintenance instance of the analytics computing service the, first maintenance instance of the analytics computing service being different than the subject instance of the analytics computing service, and the first maintenance instance of the analytics computing service having a version equivalent to the version of the subject instance of the analytics computing service, the initiating of the corrective action being responsive to identifying the first maintenance event.

In Example 3, the subject matter of Example 2 optionally includes the identifying of the first maintenance event further comprising determining that the first maintenance instance of the analytics computing service is in communication with a first maintenance remote data source having a version equivalent to a version of a first remote data source identified from the plurality of remote data sources in communication with the subject instance of the analytics computing service.

In Example 4, the subject matter of Example 3 optionally includes the corrective action comprising initiating a version upgrade of the first remote data source identified from the plurality of remote data sources in communication with the subject instance of the analytics computing service.

In Example 5, the subject matter of any one or more of Examples 1-4 optionally includes the operations further comprising, identifying, by the version maintenance service, a second maintenance event of the plurality of maintenance events, the second maintenance event being associated with a second maintenance instance of the analytics computing service, the second maintenance instance of the analytics computing service having a version equivalent to the version of the subject instance of the analytics computing service.

In Example 6, the subject matter of Example 5 optionally includes the identifying of the second maintenance event further comprising determining that the second maintenance instance of the analytics computing service is in communication with a second maintenance data source having a version equivalent to a version of a second remote data source identified from the plurality of remote data sources in communication with the subject instance of the analytics computing service.

In Example 7, the subject matter of Example 6 optionally includes the corrective action comprising initiating a version upgrade of second remote data source identified from the plurality of remote data sources in communication with the subject instance of the analytics computing service.

In Example 8, the subject matter of any one or more of Examples 1-7 optionally includes the operations further comprising: receiving, by the version maintenance service, an indication of a maintenance issue at the subject instance of the analytics computing service; and sending, by the version maintenance service, a version data package to a user computing device associated with an administrative user, the version data package comprising an indication of the version of the subject instance of the analytics computing service and an indication of the respective versions for the plurality of remote data sources.

In Example 9, the subject matter of Example 8 optionally includes the operations further comprising: receiving, from the user computing device associated with the administrative user, resolution data describing a resolution of the maintenance issue at the subject instance of the analytics computing service; and supplementing the maintenance data records using the version data package and the resolution data.

In Example 10, the subject matter of any one or more of Examples 1-9 optionally includes the plurality of remote data sources in communication with the subject instance of the analytics computing service comprising a first software service executed at an on-premise computing system and a second software service executed in a second cloud environment different than the first cloud environment.

Example 11 is a method of maintaining a cloud-delivered analytics computing service, the method comprising: executing, a version maintenance service at a first cloud environment, the version maintenance service in communication with a subject instance of an analytics computing service, the subject instance of the analytics computing service being executed at the first cloud environment; accessing, by the version maintenance service, version data for the subject instance of an analytics computing service, the version data describing a version of the subject instance of the analytics computing service; scanning, by the version maintenance service, a plurality of remote data sources in communication with the subject instance of the analytics computing service to determine respective versions for the plurality of remote data sources; accessing, by the version maintenance service, maintenance data records describing a plurality of maintenance events associated with at least one instance of the analytics computing service executing at the first cloud environment; and initiating a corrective action, the corrective action being based at least in part on the maintenance data records, and the corrective action comprising at least one of initiating an upgrade of the subject instance of the analytics computing service or initiating an upgrade of at least one remote data source of the plurality of remote data sources in communication with the subject instance of the analytics computing service.

In Example 12, the subject matter of Example 11 optionally includes identifying, by the version maintenance service, a first maintenance event of the plurality of maintenance events, the first maintenance event describing a first maintenance instance of the analytics computing service the, first maintenance instance of the analytics computing service being different than the subject instance of the analytics computing service, and the first maintenance instance of the analytics computing service having a version equivalent to the version of the subject instance of the analytics computing service, the initiating of the corrective action being responsive to identifying the first maintenance event.

In Example 13, the subject matter of Example 12 optionally includes the identifying of the first maintenance event further comprising determining that the first maintenance instance of the analytics computing service is in communication with a first maintenance remote data source having a version equivalent to a version of a first remote data source identified from the plurality of remote data sources in communication with the subject instance of the analytics computing service.

In Example 14, the subject matter of Example 13 optionally includes the corrective action comprising initiating a version upgrade of the first remote data source identified from the plurality of remote data sources in communication with the subject instance of the analytics computing service.

In Example 15, the subject matter of any one or more of Examples 11-14 optionally includes identifying, by the version maintenance service, a second maintenance event of the plurality of maintenance events, the second maintenance event being associated with a second maintenance instance of the analytics computing service, the second maintenance instance of the analytics computing service having a version equivalent to the version of the subject instance of the analytics computing service.

In Example 16, the subject matter of Example 15 optionally includes the identifying of the second maintenance event further comprising determining that the second maintenance instance of the analytics computing service is in communication with a second maintenance data source having a version equivalent to a version of a second remote data source identified from the plurality of remote data sources in communication with the subject instance of the analytics computing service.

In Example 17, the subject matter of Example 16 optionally includes the corrective action comprising initiating a version upgrade of second remote data source identified from the plurality of remote data sources in communication with the subject instance of the analytics computing service.

In Example 18, the subject matter of any one or more of Examples 11-17 optionally includes receiving, by the version maintenance service, an indication of a maintenance issue at the subject instance of the analytics computing service; and sending, by the version maintenance service, a version data package to a user computing device associated with an administrative user, the version data package comprising an indication of the version of the subject instance of the analytics computing service and an indication of the respective versions for the plurality of remote data sources.

In Example 19, the subject matter of Example 18 optionally includes receiving, from the user computing device associated with the administrative user, resolution data describing a resolution of the maintenance issue at the subject instance of the analytics computing service; and supplementing the maintenance data records using the version data package and the resolution data.

Example 20 is a non-transitory machine-readable medium comprising instructions thereon that, when executed by at least one processor, cause the at least one processor to perform operations comprising: executing, a version maintenance service at a first cloud environment, the version maintenance service in communication with a subject instance of an analytics computing service, the subject instance of the analytics computing service being executed at the first cloud environment; accessing, by the version maintenance service, version data for the subject instance of an analytics computing service, the version data describing a version of the subject instance of the analytics computing service; scanning, by the version maintenance service, a plurality of remote data sources in communication with the subject instance of the analytics computing service to determine respective versions for the plurality of remote data sources; accessing, by the version maintenance service, maintenance data records describing a plurality of maintenance events associated with at least one instance of the analytics computing service executing at the first cloud environment; and initiating a corrective action, the corrective action being based at least in part on the maintenance data records, and the corrective action comprising at least one of initiating an upgrade of the subject instance of the analytics computing service or initiating an upgrade of at least one remote data source of the plurality of remote data sources in communication with the subject instance of the analytics computing service.

Figure 7:
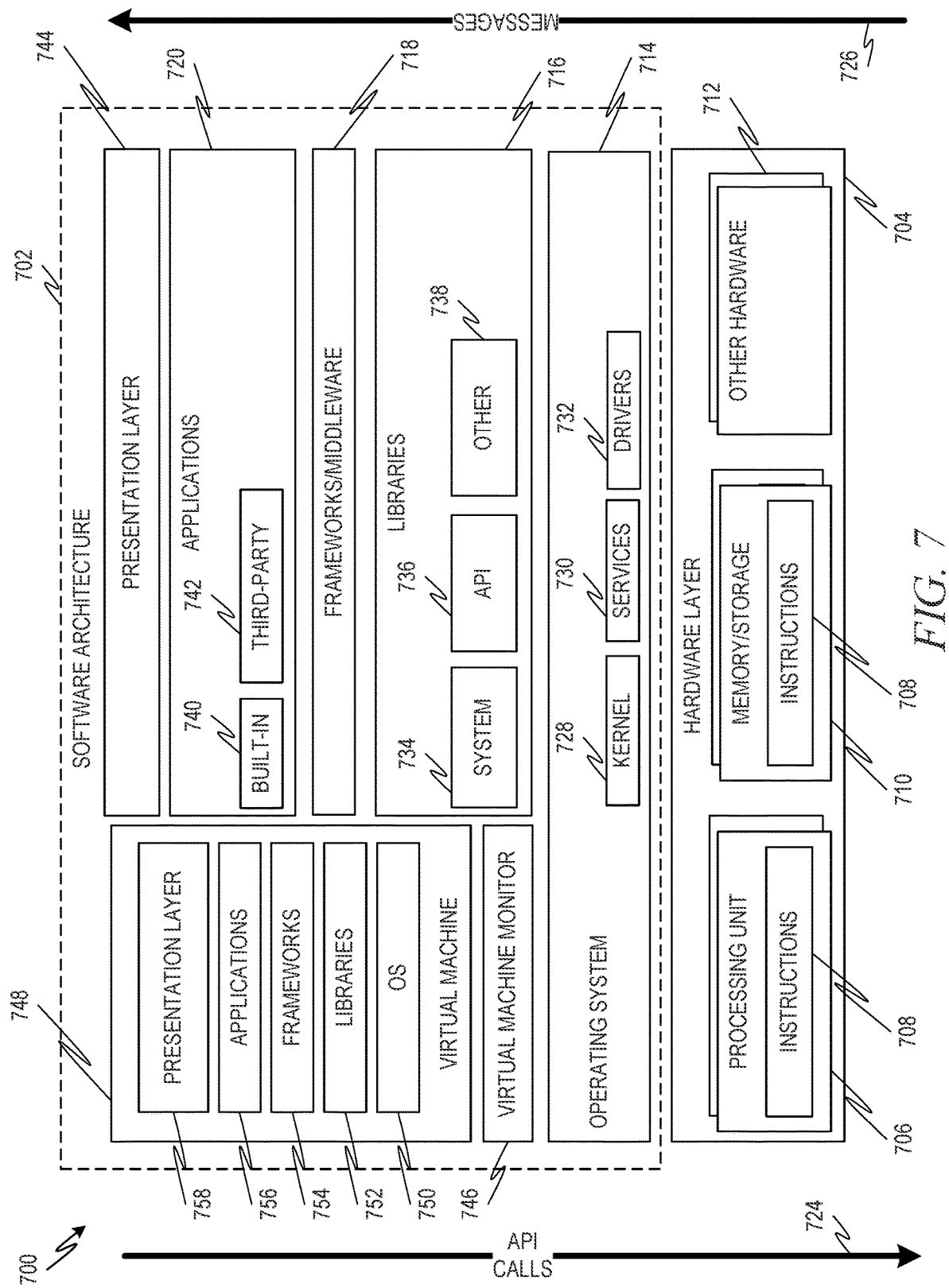
FIG. 7 is a block diagram showing one example of an architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the architecture 702.

In the example architecture of FIG. 7, the software architecture 702 may be conceptualized as a stack of layers where each layer provides particular functionality. For example, the software architecture 702 may include layers such as an operating system 714, libraries 716, middleware layer 718, applications 720, and presentation layer 744. Operationally, the applications 720 and/or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The middleware layer 718 (also sometimes referred to as frameworks) may provide a higher-level common infrastructure that may be utilized by the applications 720 and/or other software components/modules. For example, the middleware layer 718 may provide various graphic user interface (GUI) functions, high-level resource management, high-level location services, and so forth. The middleware layer 718 may provide a broad spectrum of other APIs that may be utilized by the applications 720 and/or other software components/modules, some of which may be specific to a particular operating system or platform.

The applications 720 includes built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows®. Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, API libraries 736, and other libraries 738), and middleware layer 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
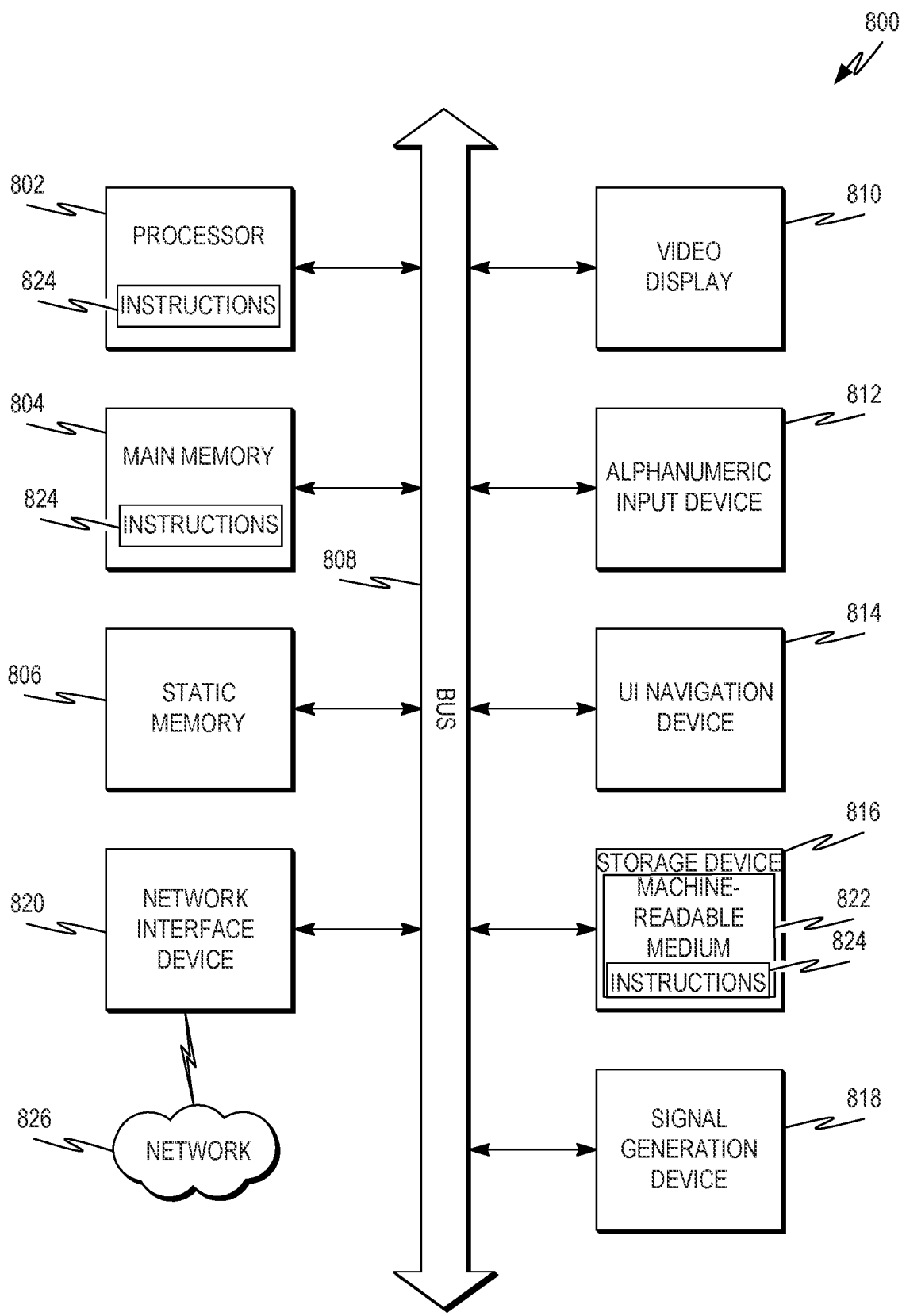
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for maintaining a cloud-delivered analytics computing service, the system comprising:
   at least one hardware processor programmed perform operations comprising:
   executing, a version maintenance service at a first cloud environment, the version maintenance service in communication with a subject instance of an analytics computing service, the subject instance of the analytics computing service being executed at a first tenancy of the first cloud environment;
   accessing, by the version maintenance service, version data for the subject instance of an analytics computing service, the version data describing a version of the subject instance of the analytics computing service;
   scanning, by the version maintenance service, a plurality of remote data sources in communication with the subject instance of the analytics computing service to determine respective versions for the plurality of remote data sources, at least one of the plurality of remote data sources being executed remote from the first tenancy;
   accessing, by the version maintenance service, maintenance data records describing a plurality of maintenance events associated with at least one instance of the analytics computing service executing at the first cloud environment;
   determining, by the version maintenance service, that a first maintenance event of the plurality of maintenance events is associated with a first maintenance instance of the analytics computing service having a version equivalent to the version of the subject instance of the analytics computing service and with a first maintenance instance of a remote data source having a version equivalent to a version of a first remote data source of the plurality of remote data sources in communication with the subject instance of the analytics computing service; and
   initiating a corrective action, the corrective action being based at least in part on the maintenance data records, and the corrective action comprising at least one of initiating an upgrade of the subject instance of the analytics computing service or initiating an upgrade of the first remote data source.

2. The system of claim 1, the initiating of the corrective action being responsive to the determining that the first maintenance event is associated with the first maintenance instance of the analytics computing service having the version equivalent to the version of the subject instance of the analytics computing service and with the first maintenance instance of the remote data source having a version equivalent to the version of the first remote data source.

3. The system of claim 2, the operations further comprising determining that the first maintenance instance of the analytics computing service is in communication with the first maintenance instance of the remote data source.

4. The system of claim 3, the corrective action comprising initiating a version upgrade of the first remote data source identified from the plurality of remote data sources in communication with the subject instance of the analytics computing service.

5. The system of claim 1, the operations further comprising, identifying, by the version maintenance service, a second maintenance event of the plurality of maintenance events, the second maintenance event being associated with a second maintenance instance of the analytics computing service, the second maintenance instance of the analytics computing service having a version equivalent to the version of the subject instance of the analytics computing service.

6. The system of claim 5, the identifying of the second maintenance event further comprising determining that the second maintenance instance of the analytics computing service is in communication with a second maintenance data source having a version equivalent to a version of a second remote data source identified from the plurality of remote data sources in communication with the subject instance of the analytics computing service.

7. The system of claim 6, the corrective action comprising initiating a version upgrade of second remote data source identified from the plurality of remote data sources in communication with the subject instance of the analytics computing service.

8. The system of claim 1, the operations further comprising:
   receiving, by the version maintenance service, an indication of a maintenance issue at the subject instance of the analytics computing service; and
   sending, by the version maintenance service, a version data package to a user computing device associated with an administrative user, the version data package comprising an indication of the version of the subject instance of the analytics computing service and an indication of the respective versions for the plurality of remote data sources.

9. The system of claim 8, the operations further comprising:
   receiving, from the user computing device associated with the administrative user, resolution data describing a resolution of the maintenance issue at the subject instance of the analytics computing service; and
   supplementing the maintenance data records using the version data package and the resolution data.

10. The system of claim 1, the plurality of remote data sources in communication with the subject instance of the analytics computing service comprising a first software service executed at an on-premise computing system and a second software service executed in a second cloud environment different than the first cloud environment.

11. A method of maintaining a cloud-delivered analytics computing service, the method comprising:
   executing, a version maintenance service at a first cloud environment, the version maintenance service in communication with a subject instance of an analytics computing service, the subject instance of the analytics computing service being executed at a first tenancy of the first cloud environment;

accessing, by the version maintenance service, version data for the subject instance of an analytics computing service, the version data describing a version of the subject instance of the analytics computing service;

scanning, by the version maintenance service, a plurality of remote data sources in communication with the subject instance of the analytics computing service to determine respective versions for the plurality of remote data sources, at least one of the plurality of remote data sources being executed remote from the first tenancy;

accessing, by the version maintenance service, maintenance data records describing a plurality of maintenance events associated with at least one instance of the analytics computing service executing at the first cloud environment;

determining, by the version maintenance service, that a first maintenance event of the plurality of maintenance events is associated with a first maintenance instance of the analytics computing service having a version equivalent to the version of the subject instance of the analytics computing service and with a first maintenance instance of a remote data source having a version equivalent to a version of a first remote data source of the plurality of remote data sources in communication with the subject instance of the analytics computing service; and initiating a corrective action, the corrective action being based at least in part on the maintenance data records, and the corrective action comprising at least one of initiating an upgrade of the subject instance of the analytics computing service or initiating an upgrade of at least one remote data source of the plurality of remote data sources in communication with the subject instance of the analytics computing service.

12. The method of claim 11, the initiating of the corrective action being responsive to the determining that the first maintenance event is associated with the first maintenance instance of the analytics computing service having the version equivalent to the version of the subject instance of the analytics computing service and with the first maintenance instance of the remote data source having a version equivalent to the version of the first remote data source.

13. The method of claim 12, further comprising determining that the first maintenance instance of the analytics computing service is in communication with the first maintenance instance of the remote data source.

14. The method of claim 13, the corrective action comprising initiating a version upgrade of the first remote data source identified from the plurality of remote data sources in communication with the subject instance of the analytics computing service.

15. The method of claim 11, further comprising, identifying, by the version maintenance service, a second maintenance event of the plurality of maintenance events, the second maintenance event being associated with a second maintenance instance of the analytics computing service, the second maintenance instance of the analytics computing service having a version equivalent to the version of the subject instance of the analytics computing service.

16. The method of claim 15, the identifying of the second maintenance event further comprising determining that the second maintenance instance of the analytics computing service is in communication with a second maintenance data source having a version equivalent to a version of a second remote data source identified from the plurality of remote data sources in communication with the subject instance of the analytics computing service.

17. The method of claim 16, the corrective action comprising initiating a version upgrade of second remote data source identified from the plurality of remote data sources in communication with the subject instance of the analytics computing service.

18. The method of claim 11, further comprising:

receiving, by the version maintenance service, an indication of a maintenance issue at the subject instance of the analytics computing service; and sending, by the version maintenance service, a version data package to a user computing device associated with an administrative user, the version data package comprising an indication of the version of the subject instance of the analytics computing service and an indication of the respective versions for the plurality of remote data sources.

19. The method of claim 18, further comprising:

receiving, from the user computing device associated with the administrative user, resolution data describing a resolution of the maintenance issue at the subject instance of the analytics computing service; and supplementing the maintenance data records using the version data package and the resolution data.

20. A non-transitory machine-readable medium comprising instructions thereon that, when executed by at least one processor, cause the at least one processor to perform operations comprising:

executing, a version maintenance service at a first cloud environment, the version maintenance service in communication with a subject instance of an analytics computing service, the subject instance of the analytics computing service being executed at a first tenancy of the first cloud environment;

accessing, by the version maintenance service, version data for the subject instance of an analytics computing service, the version data describing a version of the subject instance of the analytics computing service;

scanning, by the version maintenance service, a plurality of remote data sources in communication with the subject instance of the analytics computing service to determine respective versions for the plurality of remote data sources, at least one of the plurality of remote data sources being executed remote from the first tenancy;

accessing, by the version maintenance service, maintenance data records describing a plurality of maintenance events associated with at least one instance of the analytics computing service executing at the first cloud environment;

determining, by the version maintenance service, that a first maintenance event of the plurality of maintenance events is associated with a first maintenance instance of the analytics computing service having a version equivalent to the version of the subject instance of the analytics computing service and with a first maintenance instance of a remote data source having a version equivalent to a version of a first remote data source of the plurality of remote data sources in communication with the subject instance of the analytics computing service; and initiating a corrective action, the corrective action being based at least in part on the maintenance data records, and the corrective action comprising at least one of initiating an upgrade of the subject instance of the analytics computing service or initiating an upgrade of at least one remote data source of the plurality of remote data sources in communication with the subject instance of the analytics computing service.

* * * * *